United States Patent
Estey

(10) Patent No.: US 9,271,485 B2
(45) Date of Patent: Mar. 1, 2016

(54) OUTDOOR PULL DEVICE

(76) Inventor: Ryan Estey, St. Paul, MN (US)

( * ) Notice: Subject to any disclaimer, the term of this patent is extended or adjusted under 35 U.S.C. 154(b) by 2 days.

(21) Appl. No.: 13/020,612

(22) Filed: Feb. 3, 2011

(65) Prior Publication Data
US 2012/0200103 A1    Aug. 9, 2012

(51) Int. Cl.
*B65G 7/12* (2006.01)
*A01M 31/00* (2006.01)

(52) U.S. Cl.
CPC ............... *A01M 31/006* (2013.01); *B65G 7/12* (2013.01)

(58) Field of Classification Search
CPC . B65G 7/12; A01M 31/006; A45F 2005/1013
USPC ............... 294/149, 150, 152–157, 165, 74; 224/103, 921
See application file for complete search history.

(56) References Cited

U.S. PATENT DOCUMENTS

| | | | | |
|---|---|---|---|---|
| 2,861,727 A | * | 11/1958 | Veres | 224/103 |
| 3,188,130 A | * | 6/1965 | Pietrowicz | 294/74 |
| 3,752,525 A | * | 8/1973 | Hanna et al. | 294/74 |
| 4,016,622 A | * | 4/1977 | Eisenman | 15/222 |
| 4,696,504 A | * | 9/1987 | Roberts, Jr. | 294/148 |
| 4,828,307 A | * | 5/1989 | Sokol et al. | 452/192 |
| 5,150,938 A | * | 9/1992 | Gans | 294/156 |
| 5,183,334 A | * | 2/1993 | Geistlinger | 366/129 |
| 5,255,947 A | * | 10/1993 | Schwartz | 294/31.2 |
| 5,564,583 A | * | 10/1996 | Kelley et al. | 220/23.83 |
| 5,971,458 A | * | 10/1999 | Contreras et al. | 294/150 |
| 6,089,636 A | * | 7/2000 | Harris | 294/150 |
| D434,199 S | * | 11/2000 | Alviso | D34/28 |
| 6,142,547 A | * | 11/2000 | Bowerman | 294/150 |
| 6,457,763 B2 | | 10/2002 | Cornelius | |
| 7,118,149 B1 | * | 10/2006 | Mertz, Jr. | 294/152 |
| 8,062,107 B1 | * | 11/2011 | Sauer | 452/197 |
| 2006/0207521 A1 | * | 9/2006 | Klauck | 119/786 |

OTHER PUBLICATIONS

Glenn's Deer Handle, http://www.deerhandle.com, Feb. 3, 2011.

* cited by examiner

*Primary Examiner* — Dean Kramer
(74) *Attorney, Agent, or Firm* — Merchant & Gould P.C.

(57) ABSTRACT

An outdoor pull device comprising a handle; at least two through holes through the handle, the through holes running substantially parallel to each other; one or more cords traveling through at least two through holes of the at least two through holes of the pull device, wherein the one or more cords affixes to the handle at each through hole such that the integrated handle and one or more cords create at least one loop; and at least two fastening mechanisms on the cord to prevent the cord from exiting the handle, wherein the at least two through holes each have at least two distinct diameters in the handle, wherein the first diameter is sufficient to allow both the one or more cords and the affixed fastening mechanisms into the handle, and wherein the second diameter is sufficient to allow the one or more cords through the handle, but not the affixed fastening mechanisms.

4 Claims, 7 Drawing Sheets

OUTDOOR PULL DEVICE

TECHNICAL FIELD

The document generally describes a device to assist in dragging heavy or cumbersome objects.

BACKGROUND OF THE INVENTION

Hunting season is one of the most anticipated times of the year for many outdoor enthusiasts. Many devices assist an individual in transporting cargo, particularly items that are cumbersome or difficult to grip. In hunting, along with other outdoor activities, the surroundings can cause greater difficulties.

Wild game is often found in uneven terrain with obstacles to man made paths and roads. The outdoorsman looking to move his kill to a vehicle can have great difficulty depending on the size or the weight of the animal. Thick underbrush, close trees, rocks, and foliage create a greater difficulty for a hunter to bring home his prize. Objects in paths, such as fallen branches, logs, and debris from other people in the forest can also present a problem in navigating to a desired location. Moving the objects by hand can cause great difficulties to an outdoorsman. A device to assist moving objects can be desirable to provide more time to the user to engage in the activities intended instead of struggling with transportation.

SUMMARY OF THE INVENTION

In a first general aspect, a first outdoor pull device is described. This device includes a handle; at least two through holes through the handle, the through holes running substantially parallel to each other; one or more cords traveling through at least two through holes of the at least two through holes of the pull device, wherein the one or more cords affixes to the handle at each through hole such that the integrated handle and one or more cords create at least one loop; and at least two fastening mechanisms on the cord to prevent the cord from exiting the handle, wherein the at least two through holes each have at least two distinct diameters in the handle, wherein the first diameter can be sufficient to allow both the one or more cords and the affixed fastening mechanisms into the handle, and wherein the second diameter can be sufficient to allow the one or more cords through the handle, but not the affixed fastening mechanisms. The outdoor pull device can include a clasp affixed to the one or more cords, wherein the cord separates into at least one more loop. The outdoor pull device can also include a spacer at the interface of each fastening mechanism and the portion of the one or more cords affixed to the fastening mechanism. The spacer can include a washer. The cord can include of at least one of the following materials: natural fibers, synthetic fibers, rubber, leather, and metal. The handle can be comprised of at least one of the following materials: plastic, wood, rubber, fiberglass, steel, PVC. The outdoor pull device can also include a cover for the handle such that the fastening mechanism can be enclosed. The cord can include one or more lengths. The outdoor pull device can include two or more handles; and two or more cords, wherein each of the handles are attached to at least one cord such that each of the handles and the attached cords form a loop, and wherein a first cord attached to a first handle is connected to a second handle with a second attached cord. The outdoor pull device can include a third handle with a third attached cord is connected to the second handle with a second attached cord.

In a first general aspect, a second outdoor pull device is described. The outdoor pull device can include a handle; at least two through holes through the handle, the through holes running substantially parallel to each other; one or more cords traveling through at least two through holes of the at least two through holes of the pull device, wherein the one or more cords affixes to the handle such that the integrated handle and one or more cords create a loop; and at least one fastening mechanism on the cord to prevent the cord from exiting the handle. The outdoor pull device can also include a clasp affixed to the one or more cords, wherein the cord separates into at least one more loop. The outdoor pull device can further include a spacer at the interface of the at least one fastening mechanism and the cord. The spacer can include a washer. The cord can include of at least one of the following materials: natural fibers, synthetic fibers, rubber, leather, and metal. The handle can be comprised of at least one of the following materials: plastic, wood, rubber, fiberglass, steel, PVC. The outdoor pull device can also include a cover for the handle such that the fastening mechanism can be enclosed. The cord can include one or more lengths. The outdoor pull device can include two or more handles; and two or more cords, wherein each of the handles are attached to at least one cord such that each of the handles and the attached cords form a loop, and wherein a first cord attached to a first handle is connected to a second handle with a second attached cord. The outdoor pull device can include a third handle with a third attached cord is connected to the second handle with a second attached cord.

In a first general aspect, a third outdoor pull device is described. The outdoor pull device can include a handle with a length of less than six inches, wherein the handle can be substantially straight; at least two through holes through the handle, the through holes running substantially parallel to each other; one or more cords traveling through at least two through holes of the at least two through holes of the pull device, wherein the one or more cords affixes to the handle such that the integrated handle and cord create a loop; and at least one fastening mechanism on the cord to prevent the cord from exiting the handle, wherein the fastening mechanism comprises a knot on each end of the cord, and wherein the at least two through holes each have at least two distinct diameters in the handle, wherein the first diameter can be sufficient to allow both the cord and the fastening mechanism into the handle, and wherein the second diameter can be sufficient to allow the cord through the handle, but not the fastening mechanism.

The details of one or more embodiments are set forth in the accompanying drawings and the description below. Other features, objects, and advantages of the invention with be apparent from the description and drawings, and from the claims.

BRIEF DESCRIPTION OF THE DRAWINGS

Like reference symbols in the various drawings indicate like elements.

DETAILED DESCRIPTION OF THE DISCLOSURE

Unlike physics, objects in the real world are not perfect spheres. Particularly in nature, rocks, trees, and animals have weight balanced in different portions. Each object has various protrusions and different materials in reference to friction and deposition of material from the object to the ground. To move objects, having adjustable devices can help greatly.

Devices help an individual move objects every day, whether mechanical, magnetic, or electrical in nature. In mechanical applications, distribution of the weight on more than one point assists the user in easing the difficulty of transport. For example, having a pulley with two wheels reduces the required force by half. Likewise, a tightrope walker can balance with a long pole in her hands because the weight distributed on either side away from the pivot point.

Furthermore, while traversing areas, having a device that is easily portable can assist an individual in being prepared without having a large object to slow progress during activities. Whether planning to transport the item ahead of time, such as during a hunting trip, or discovering a blockage in a path from a fallen tree, a user having lightweight and compact device can provide a higher likelihood that the device will be used.

In general, an object can be carried using a device by securing the device to the object. A flexible cord that can match a variety of shapes and sizes of circumferences allows a device to secure various types of objects. A handle attached to the cord provides a grip for the user. The user can wrap the cord around the object and slip the handle through a loop of the cord to secure the object. The user can then pull the object with either one or both hands on the handle. The user can also use a motor vehicle to transport the object, either after pulling the object with the device or connecting the device to the object and the vehicle immediately. Once the user has brought the object to the desired location, the user can remove the device from the object and store it in a pocket or a bag until the object is needed again.

Figure 1:
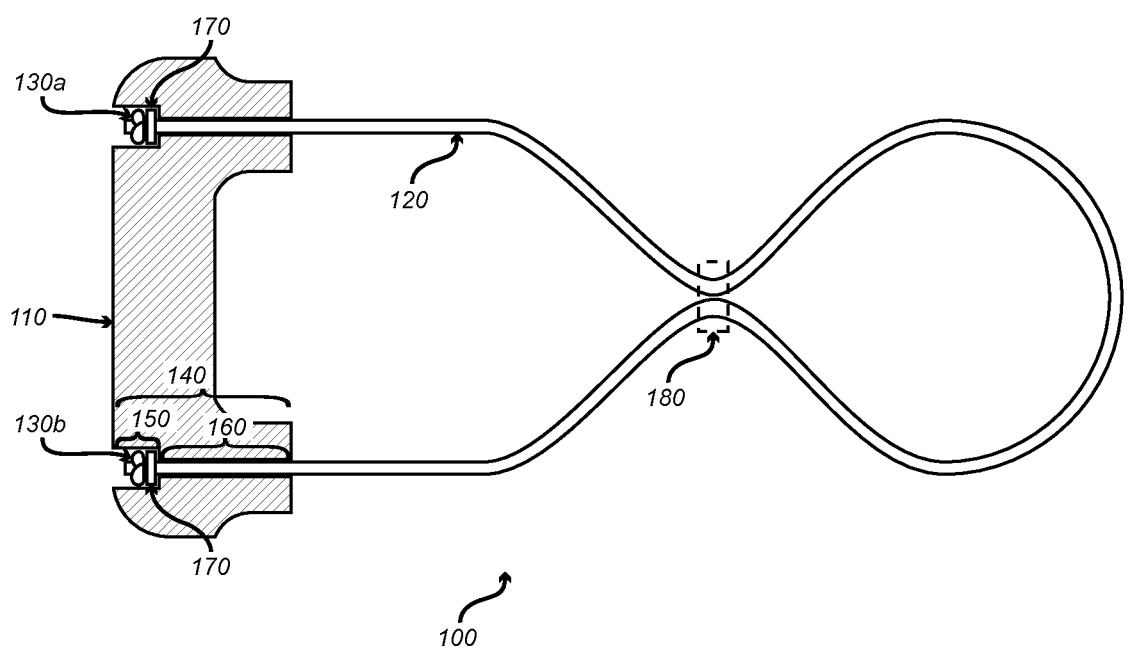
FIG. 1 is an exemplary cross section drawing of a first implementation of an outdoor pull device.

FIG. 1 shows a cross section of a first implementation of an outdoor pull device 100. The outdoor pull device 100 can include a handle 110 and a cord 120. The handle 110 can include two through holes 140, each through hole 140 sufficient for the cord 120 to pass through the handle 110. The cord 120 can be affixed to the handle 110 with fastening mechanisms 130 a and b to prevent the cord 120 from being pulled through the handle's 110 channels. The outdoor pull device 100 can form a loop from a first fastening mechanism 130a to the affixed cord 120 to a second fastening mechanism 130b, both connected to the handle 110.

The through holes 140 in the handle 110 can be substantially parallel to each other. For example, the through holes 140 can be parallel to each other. This can provide less wear on the cord 120. Further, in some embodiments, the handle 110 can have protrusions at the exits of each through hole 140. For example, the handle 110 can include tapered protrusions on the side of the handle 110 opposite of the fastening mechanisms 130 a and b.

In some embodiments, each through hole 140 can have two distinct diameters in the handle 110, wherein the first diameter is sufficient to allow both the cord 120 and the fastening mechanisms 130 a and b into the handle. This portion of the through holes 140 with the first diameter can be shown as inset channels 150. In some embodiments, the second diameter can be sufficient to allow the cord 120 through the handle 110, but not the fastening mechanisms 130 a and b. This portion of the through holes 140 with the first diameter can be shown as through channels 160.

The handle 110 of the outdoor pull device 100 can be made of various materials. The handle 110 can include one or more of materials such as plastic, wood, rubber, fiberglass, steel, and PVC. In some embodiments, the handle 110 can be textured to provide a strong grip surface. Likewise, in some embodiments, the handle 110 can have ridges to match the contours of a closed first to improve the ability of the user to hold the handle and provide comfortability to the user. In some embodiments, the handle 110 can be a specific color. For example, the handle 110 may be orange to provide safety to a hunter.

The outdoor pull device 100 can have spacers 170 between the fastening mechanisms 130 a and b and the base of the inset channels 150. The spacers 170 can include one or more washers for distributing strain on the fastening mechanisms 130 a and b. In some embodiments, the spacers 170 can include a cushioning material. For example, a sponge-like material can be used as spacers 170 to absorb impact if the cord 120 is pulled sharply. In another example, the spacers 170 can be made of a more durable material to protect the material used for the handle 110. In some embodiments, there may be fewer spacers 170 than channels. In some embodiments, there may be multiple spacers 170 for each fastening mechanism 130 a and b.

The outdoor pull device 100 can also include a cover for the handle 110 such that the fastening mechanisms 130 a and b are enclosed. In some embodiments, the cover can be a single piece. For example, the cover can fit on top of the surface of the handle 110, on the side of the handle 110 of the fastening mechanisms. In another example, the cover can be a long strip with two prongs fitting into the through holes 140. In some embodiments, the cover can be multiple pieces. For example, the cover can include stud caps, with a cap to fit over each through hole 140.

The cord 120 of the outdoor pull device 100 can be made of various materials. The cord 120 can include one or more of the following materials: natural fibers, synthetic fibers, rubber, leather, and metal. In some embodiments, the cord 120 can be a specific color. For example, the cord 120 may be orange to provide safety to a hunter.

The fastening mechanisms 130 a and b of the outdoor pull device 100 can be made of various materials. For example, the cord 120 can be knotted at each end to create the fastening mechanisms 130 a and b. In some embodiments, the ends of the cord 120 can be treated to prevent fraying. For example, the ends of the cord 120 can be burned. Likewise, an epoxy can be added to the ends, or metal or plastic can be melted to the ends of the cord 120. The epoxy or metal can be added in such a way to act as fastening mechanisms 130 a and b. In some embodiments, the cord 120 can have a pin or a clip as fastening mechanisms 130 a and b. For example, a metal pin can run through the cord 120 such that the pin rests on top of the through hole 140 on the handle 110 when the cord 120 is pulled taut from the other side. Likewise, a clip can grasp the cord 120 such that the clip rests on top of the through hole 140 on the handle 110 when the cord 120 is pulled taut from the other side.

In some embodiments, the outdoor pull device 100 can have a clasp 180 to create a smaller loop of the cord 120. For example, the clasp 180 can be adjustable along the length of the cord 120 to increase or decrease the size of the smaller loop. In some embodiments, this clasp 180 can be a removable device. For example, the clasp 180 can be a clothespin. The clasp 180 can have velcro to remove the clasp 180 as desired and to allow for a custom tension for the cord 120.

In some embodiments, the clasp 180 can be affixed to the cord 120. For example, the clasp 180 can be a metal device crimped onto two portions of the cord 120. The clasp 180 can also be the same material as the cord 120. For example, the clasp 180 can be woven around the two portions of the cord 120 in order to create the smaller loop of the cord 120.

Figure 2:
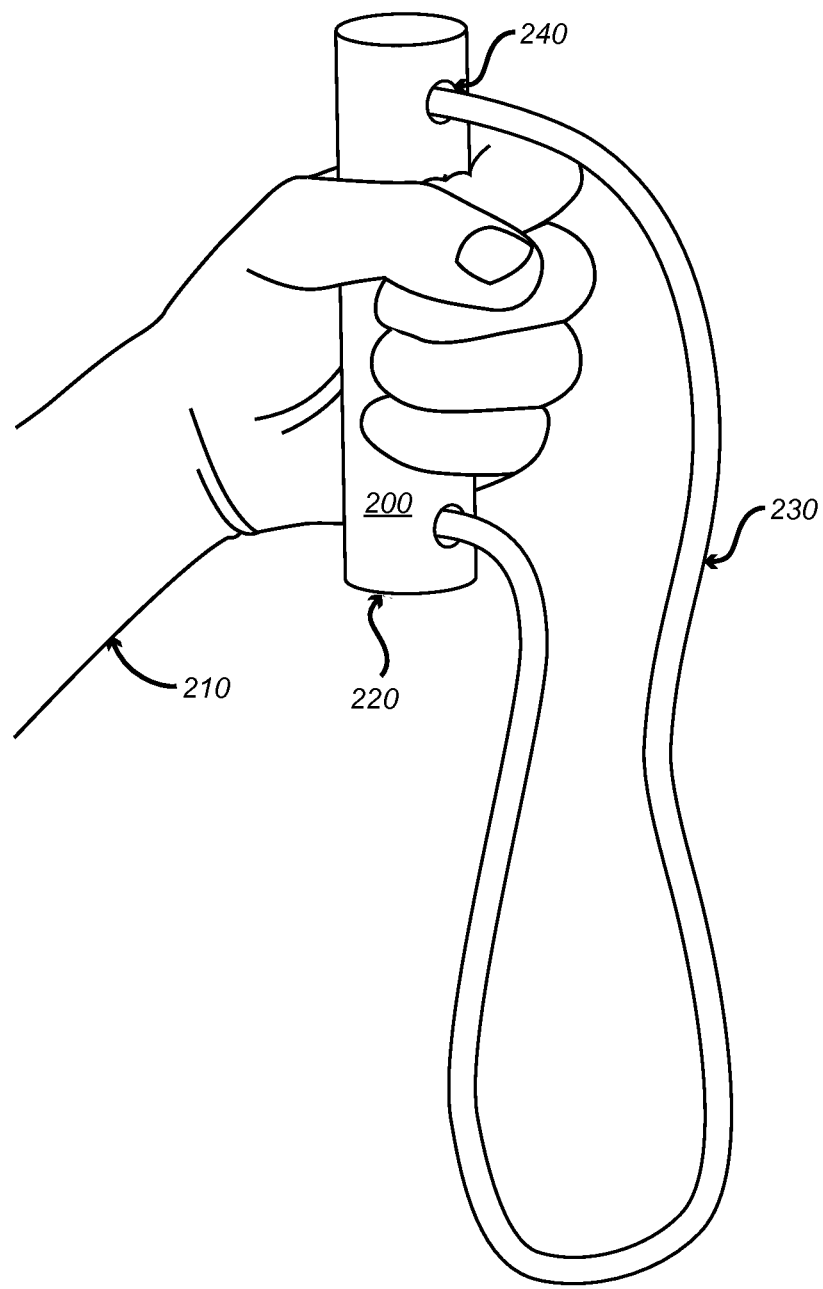
FIG. 2 is an exemplary drawing of a second implementation of an outdoor pull device.

FIG. 2 shows an exemplary drawing of a second implementation of an outdoor pull device 200. As shown, the outdoor pull device 200 can be held by a single hand 210. The outdoor pull device 200 can have a handle 220 attached to a cord 230. The handle 220 can provide through holes 240 to allow a cord 230 through the handle 220.

In some embodiments, the outdoor pull device 200 can have a single handle 220. For example, the handle 220 can have a hole to provide space for the fingers of a hand 210 to fit through, providing a sturdy grip from two sides of the handle 220. Likewise, the space in the handle 220 can allow fingers from two hands to fit through, providing a grip for two hands 210 in parallel rather than in series.

The handle 220 of the outdoor pull device 200 can have various embodiments. In some embodiments, the handle 220 can be made of more than one material, such as a hard plastic with a rubber grip. For example, the rubber grip can be affixed as a layer on the hard plastic. Alternatively, the handle 220 may be separate handles assembled together. For example, the handle 220 can have two handles; a rubber handle can be affixed at one or more points onto a hard plastic handle. The hard plastic handle can be affixed to the cord 230 while allowing the user grip the rubber handle with greater comfort than with the hard plastic handle.

The cord 230 can be a single cord attaching to two points on the handle 220. The cord 230 can be a nylon rope tied off at either end to secure it to the handle 220. In some embodiments, the cord 230 can include more than one length. For example, the cord 230 can have more than one length of nylon parallel to each other to provide more surface area to secure an object to the outdoor pull device 200. The lengths can be woven together to strengthen the cord 230.

Each of the lengths of the cord 230 can meet into one end of the cord 230. For example, the cord 230 may have two ends of woven rope with a middle section that is not woven with multiple lengths able to be separated from each other. Alternatively, each length may have two separate ends from all other lengths. For example, the cord 230 can be woven in a middle section and then separate at the ends. In some embodiments, the cord 230 can have channels for each separate portion of rope to affix to the handle 220. For example, if three lengths are braided together to form the cord 230, the handle 220 can have six channels for each end of each length of the cord 230.

Figure 3:
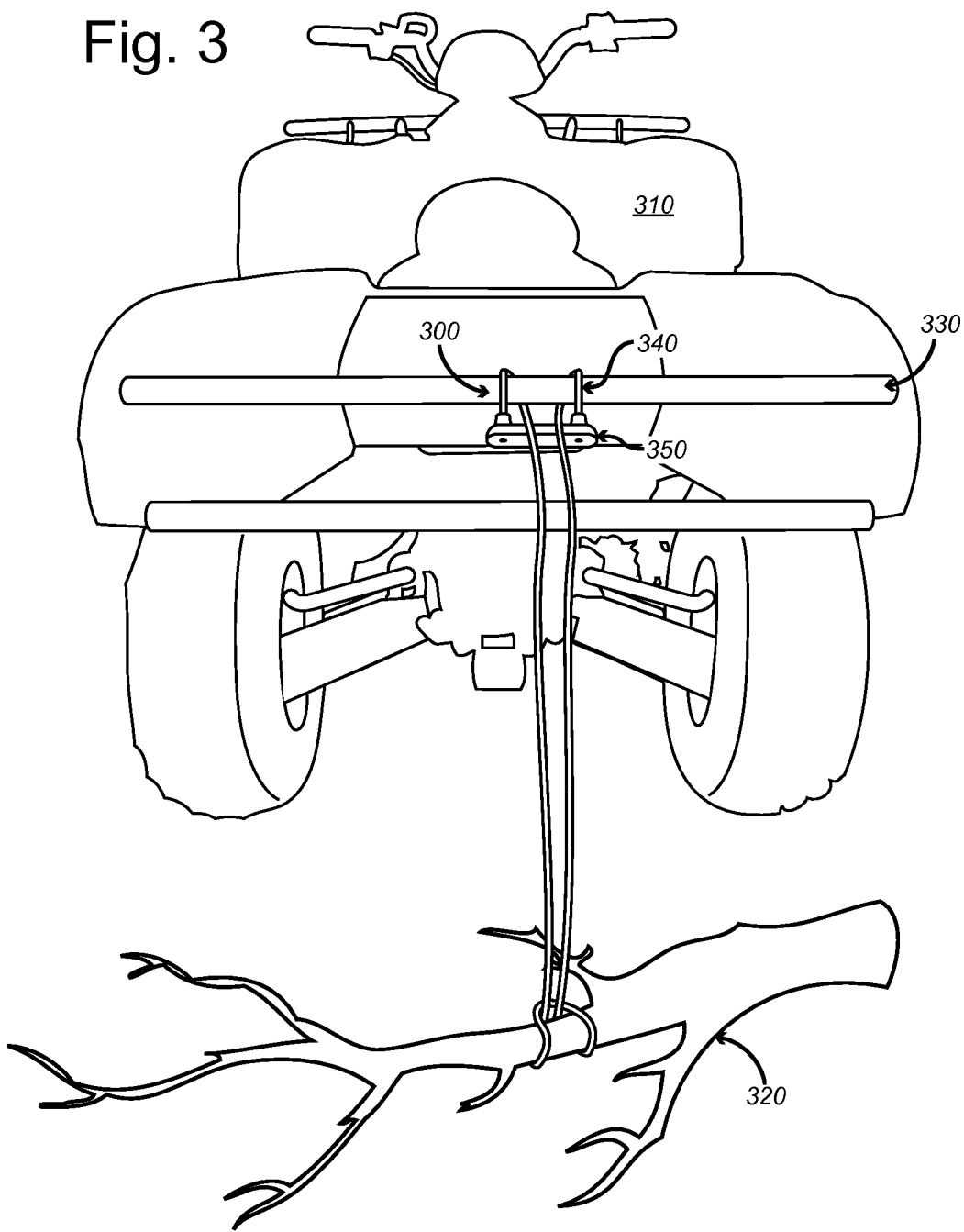
FIG. 3 is an exemplary drawing of a third implementation of an outdoor pull device in use.

FIG. 3 is an exemplary drawing of a third implementation of an outdoor pull device 300 in use with a motor vehicle 310. A rider on the motor vehicle 310 can use an outdoor pull device 300 to move an object 320. For example, using the motor vehicle 310 with the outdoor pull device 300 allows a rider to move objects larger than the rider can carry, objects that the rider wishes to move long distances, and objects with which the rider does not want to come into close contact for extended periods of time (e.g., a branch with many sharp edges).

The outdoor pull device 300 can be connected to a back hitch 330 of the motor vehicle 310. For example, as shown in FIG. 3, the back hitch 330 can be behind the rider's seat on the motor vehicle 310. The outdoor pull device 300 can be connected with a cord 340 looped around the back hitch 330 and through a handle 350 of the outdoor pull device 300. Again, as shown in FIG. 3, the cord 340 can also be looped around the object 320 to connect the object to the motor vehicle 310.

In the above example, the object 320 is a tree branch. The object 320 can be a number of items, such as game or portions of a fence. The outdoor pull device 300 can be used to demolish structures that the rider wishes to destroy. For example, the rider can connect the cord 340 to a post of a hunting stand that has rotted or is no longer in an area where game is plentiful. The rider can also demolish a structure using the outdoor pull device 300 without using the motor vehicle 310 and simply pull the connected outdoor pull device 300 away from the connected structure in order to dismantle the intended structure.

Figure 4:
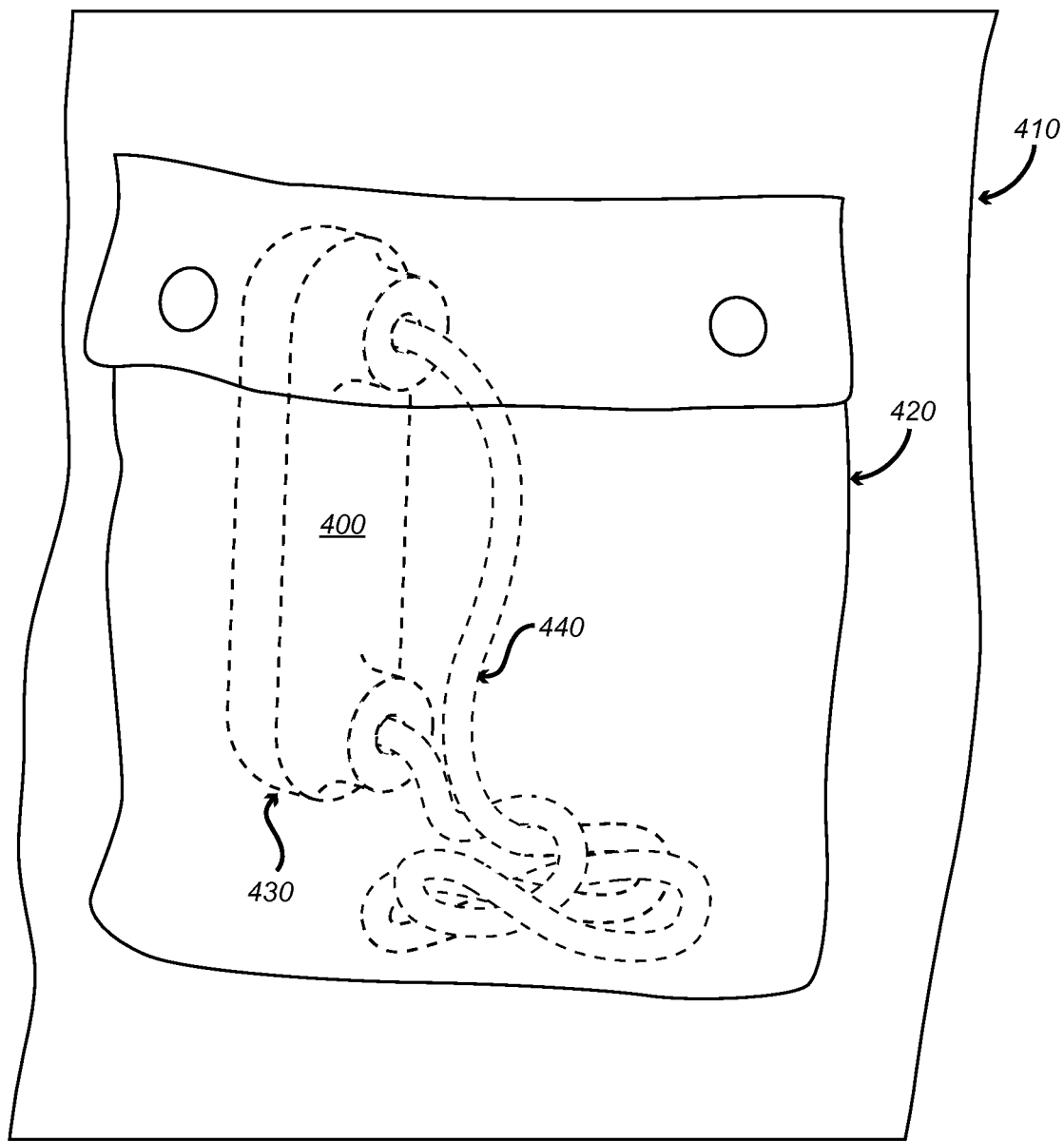
FIG. 4 is an exemplary drawing of a fourth implementation of an outdoor pull device being carried in a cargo pocket of camouflage pants.

FIG. 4 is an exemplary drawing of a fourth implementation of an outdoor pull device 400 being carried in camouflage pants 410. The camouflage pants 410 can have a pocket 420. The pocket 420 can be on the side, front, or back of the camouflage pants 410. A user can carry the outdoor pull device 400 in the pocket 420 of the camouflage pants 410. The outdoor pull device 400 can have a handle 430 and a cord 440.

In some embodiments, the handle 430 can be less than eight inches in length. This length can provide a size that allows the user to carry the outdoor pull device 400 in a pocket or on a belt. The cord 440 can be wrapped around the handle 430 or folded in the pocket 420 so that the entire outdoor pull device 400 is within the pocket 420 as shown in FIG. 4. Alternatively, the user can wrap the outdoor pull device 400 around his belt in the same manner that he would wrap the outdoor pull device 400 around an object he wants to move to secure the outdoor pull device 400 to himself and leave his arms free for more mobility.

One potential advantage of the length of the handle 430 being less than eight inches is that the outdoor pull device 400 can be carried or transported without burdening the user while traversing the outdoors. For example, if the handle 430 was more than a yard long, the outdoor pull device 400 could not easily be carried in the user's clothing. The user would likely have to carry the outdoor pull device 400 in his hand or around his body in such a way that would impede on his ability to travel through a wilderness setting.

Figure 5A:
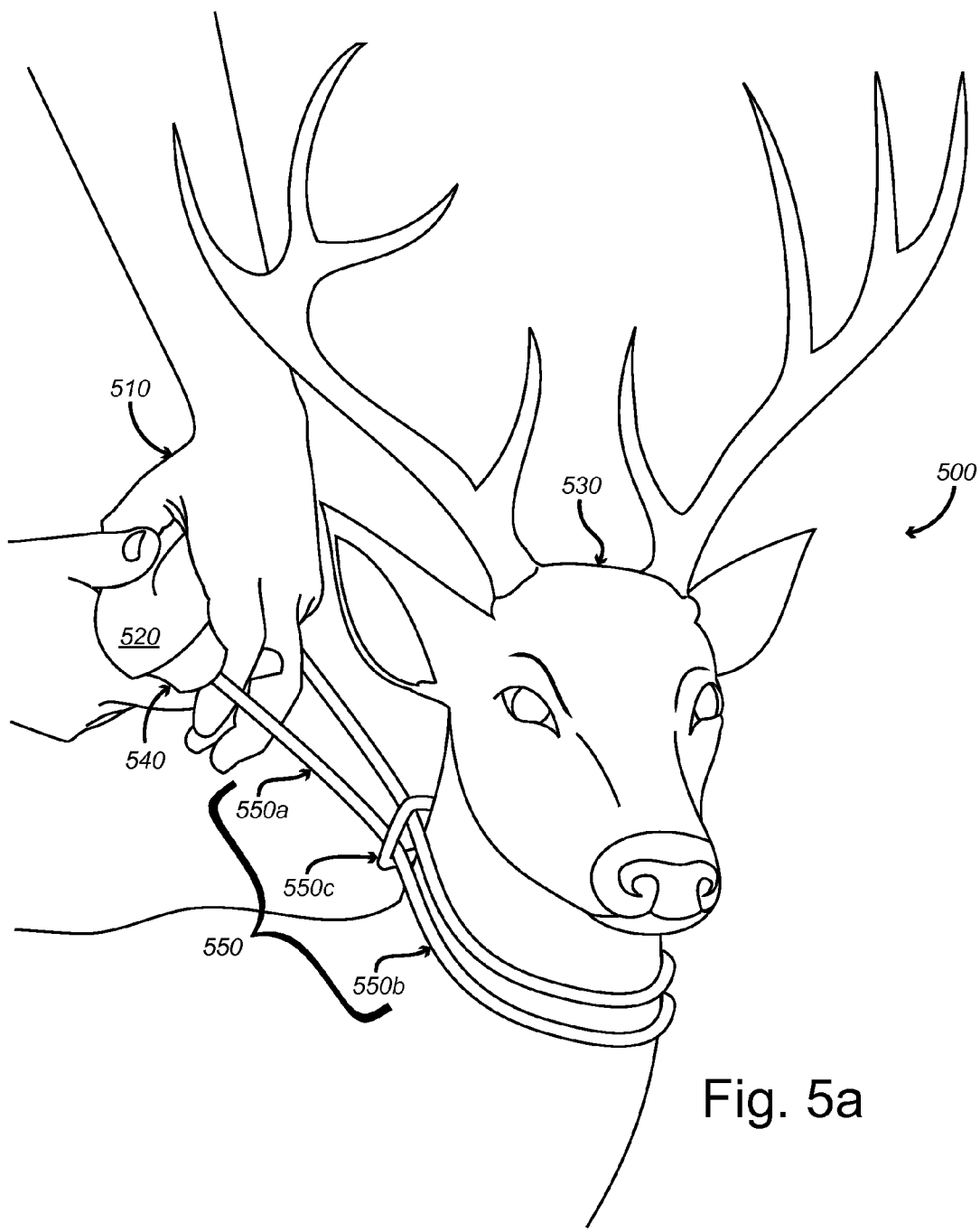
FIG. 5A is an exemplary drawing of a fifth implementation of an outdoor pull device in use.

FIG. 5A is an exemplary drawing of a fifth implementation of an outdoor pull device 500 in use in a hunting setting. A hunter 510 can connect the outdoor pull device 500, gripping a handle 520 of the outdoor pull device 500, to game 530. The handle 520 can include tapered protrusions 540. The handle 520 can be attached to a cord 550.

The cord 550 can be described in three separate portions. For example, a first portion 550*a* can start from the handle 520. A second portion 550*b* can encircle the game 530. A third portion 550*c* can separate the first portion 550*a* and the second portion 550*b*. The loop created from the portions 550*a, b, c* of the cord 550 grips the game 530 tighter as the hunter 510 pulls the game 530 to the desired location.

Figure 5B:
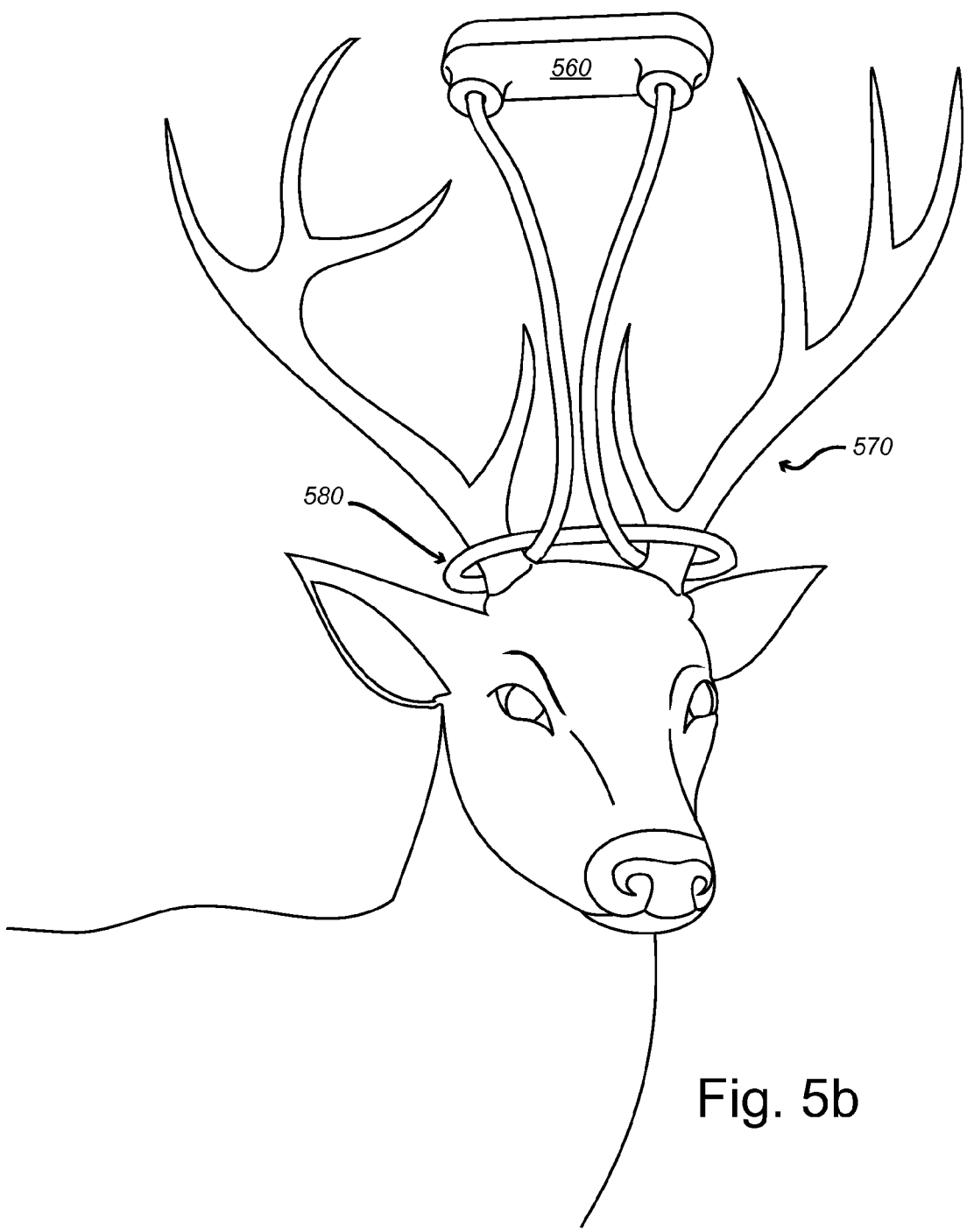
FIG. 5B is an exemplary drawing of a sixth implementation of an outdoor pull device in use.

FIG. 5B is an exemplary drawing of a sixth implementation of an outdoor pull device 560 in use. The outdoor pull device 560 can have a cord 570 to secure game 580. The game 580 can be transported using the outdoor pull device 560.

In some implementations, the outdoor pull device 560 can be connected to the game 580 in such a manner to assure that the preferred portion of the game 580 may not incur damage during transport. For example, the outdoor pull device 560 shown in FIG. 5B is connected to the antlers of the game 580. For many outdoors enthusiasts, the antlers are the desired trophy in hunting, and therefore, the least amount of damage, the better. In some implementations, connecting the outdoor pull device 560 in such a manner can allow the game 560 to be pulled so that the portion of the game 560 connected to the outdoor pull device 560 is not, for example, dragged on the ground during transport.

Figure 6:
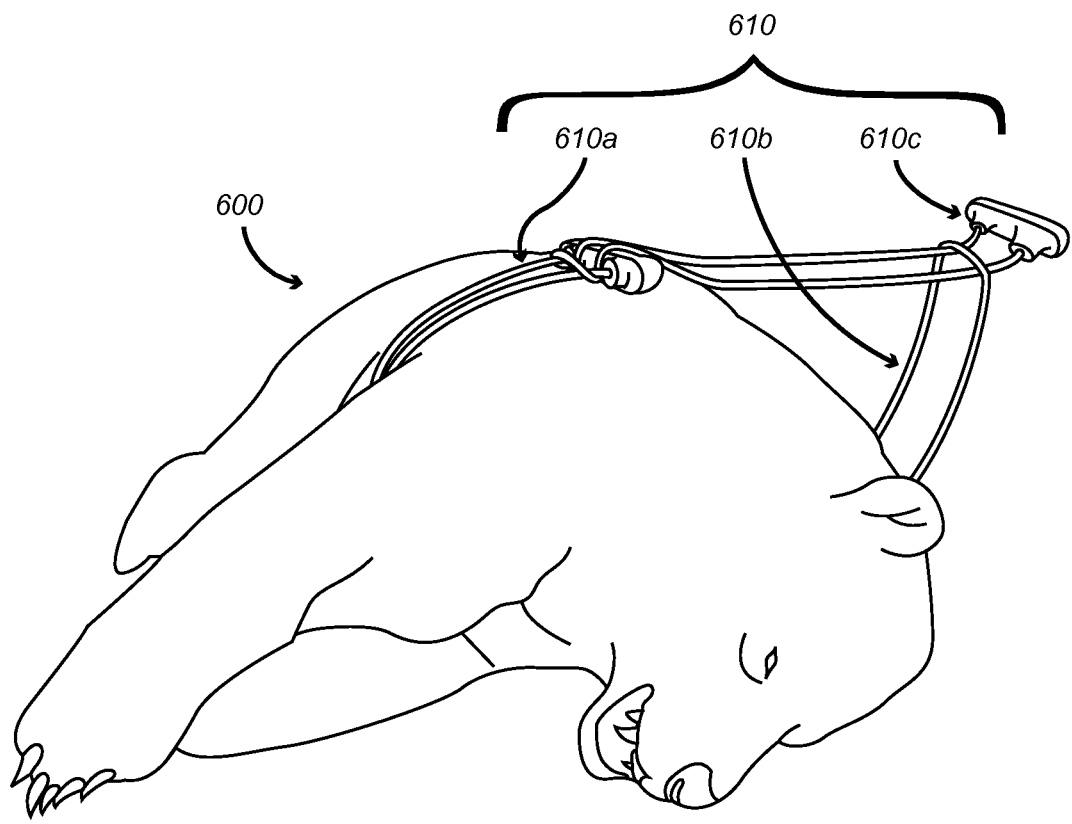
FIG. 6 is an exemplary drawing of a seventh implementation pulling an animal with an outdoor pull device.

FIG. 6 is an exemplary drawing of a seventh implementation pulling an animal 600 with an outdoor pull device 610. The outdoor pull device 610 is shown in FIG. 6 as having three separate portions: a first portion 610a comprising a first handle and cord, a second portion 610b comprising a second handle and cord, and a third portion 610c comprising a third handle and cord. The first portion 610a can be connected to the second portion 610b to provide more material to reach around a larger object. Likewise, the third portion 610c and the second portion 610b can be connected to reach around an even larger object. As shown in FIG. 6, all three portions 610a, b, and c can be connected to create the outdoor pull device 610.

In some implementations, the portions 610a, b, and c can be of equal size. In some implementations, the portions 610a, b, and c can have similar handles and similar cords. For example, the portions 610a, b, and c can be identical. In some implementations, the portions 610a, b, and c, may not be similar. For example, the third portion 610c can have a larger handle than the first and second portions 610a and b.

In some implementations, each of the portions 610a, b, and c can be disconnected. For example, three rangers may each carry a portion as part of their everyday equipment. In an emergency situation where a bear should need to be tranquilized and transported quickly, the rangers can work together to connect their portions and drag the bear to the intended location. In some implementations, an individual can carry multiple portions either in pockets or attached to a belt for ease of use.

A number of embodiments of the invention have been described. Nevertheless, it will be understood that various modifications may be made without departing from the spirit and scope of the invention. For example, the handle can be a circular shape so that the user can slip his arm through the hole of the handle and slide it to his bicep while gripping the cord to drag an object. In addition, the handle can be a magnetic material so that it can have more stability if it is connected to a motorized vehicle in transporting various objects. Accordingly, other embodiments are within the scope of the following claims.

What is claimed is:

1. An outdoor pull device comprising:
   a first handle;
   at least two through holes through the first handle, the through holes running substantially parallel to each other;
   a first one or more cords traveling through at least two through holes of the at least two through holes of the pull device,
   wherein the first one or more cords affixes to the first handle such that the integrated first handle and the first one or more cords create a loop;
   at least one fastening mechanism on the first one or more cords to prevent the first one or more cords from exiting the first handle;
   a second handle;
   a second cord, wherein each of the first handle and second handle are attached to at least one cord of the first one or more cords and the second cord such that each of the handles and the attached cords form a loop, and wherein a first cord attached to a first handle is connected to a second handle with a second attached cord; and
   a third handle with a third attached cord that is connected to the second handle with a second attached cord.

2. The outdoor pull device of claim 1, wherein the first one or more cords and the second cord are comprised of at least one of the following materials: natural fibers, synthetic fibers, rubber, leather, and metal.

3. The outdoor pull device of claim 1, wherein the at least one fastening mechanism is selected from a group of fastening mechanism types comprising:
   a knot;
   a pin; and
   a clip.

4. The outdoor pull device of claim 1, wherein the first handle has a length of less than six inches.

* * * * *